United States Patent
Yu

(10) Patent No.: US 9,469,289 B2
(45) Date of Patent: Oct. 18, 2016

(54) ENERGY RESERVATION COORDINATION FOR HYBRID VEHICLE

(71) Applicant: FORD GLOBAL TECHNOLOGIES, LLC, Dearborn, MI (US)

(72) Inventor: Hai Yu, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 138 days.

(21) Appl. No.: 14/251,706

(22) Filed: Apr. 14, 2014

(65) Prior Publication Data
US 2015/0291145 A1 Oct. 15, 2015

(51) Int. Cl.
| B60W 20/00 | (2016.01) |
| B60W 10/06 | (2006.01) |
| B60W 10/08 | (2006.01) |
| B60W 10/26 | (2006.01) |

(52) U.S. Cl.
CPC ............ *B60W 10/06* (2013.01); *B60W 10/08* (2013.01); *B60W 10/26* (2013.01); *B60W 20/12* (2016.01); *B60W 20/13* (2016.01); *B60W 2510/244* (2013.01); *B60W 2550/22* (2013.01); *B60W 2550/402* (2013.01); *B60W 2710/244* (2013.01); *Y02T 10/6286* (2013.01)

(58) Field of Classification Search
CPC .... B60W 20/00; B60W 10/08; B60W 10/06; Y02T 10/6286; B60K 6/445
USPC ......................................................... 701/22
See application file for complete search history.

(56) References Cited

U.S. PATENT DOCUMENTS

| 7,826,941 B2 | 11/2010 | Hayashi et al. | |
| 2003/0015358 A1* | 1/2003 | Abe ......................... | B60K 6/48 180/65.25 |
| 2003/0015874 A1* | 1/2003 | Abe ......................... | B60K 6/48 290/40 C |
| 2009/0101421 A1 | 4/2009 | Oyobe et al. | |
| 2011/0166733 A1* | 7/2011 | Yu .......................... | B60K 6/445 701/22 |
| 2011/0288712 A1 | 11/2011 | Wang et al. | |
| 2015/0274028 A1* | 10/2015 | Payne ................. | B60L 11/1861 701/22 |

FOREIGN PATENT DOCUMENTS

| JP | 2009143563 A | 7/2009 |
| JP | 2011230678 | 11/2011 |
| KR | 100867808 B1 | 11/2008 |

* cited by examiner

*Primary Examiner* — Jelani Smith
(74) *Attorney, Agent, or Firm* — David B. Kelley; Brook Kushman P.C.

(57) ABSTRACT

A hybrid vehicle includes a controller configured to, in response to an anticipated vehicle route for a current drive cycle including at least two preferred electric drive ("EV") zones, control an engine to charge a battery in response to a battery SOC falling below various thresholds at various portions of the vehicle route. The controller controls the engine to charge the battery in response to the battery SOC falling below a first threshold and the vehicle not having entered the first EV zone, in response to the battery SOC falling below a second threshold and the vehicle having entered the first EV zone but not the second EV zone, and in response to the battery SOC falling below a third threshold and the vehicle having entered the second EV zone. The first threshold is greater than the second threshold, and the second threshold is greater than the third threshold.

10 Claims, 3 Drawing Sheets

ENERGY RESERVATION COORDINATION FOR HYBRID VEHICLE

TECHNICAL FIELD

This disclosure relates to hybrid vehicles and method of coordinating energy usage in such vehicles.

BACKGROUND

Hybrid electric vehicles (HEVs) include engines that may be stopped and started while the vehicle is in motion. When the engine is stopped while the vehicle is in motion, the hybrid vehicle may operate in an "electric only" mode. A controller may issue stop (or "pull down") or start (or "pull up") commands to the engine in response to various conditions including a reduced battery state of charge. Plug-in hybrid electric vehicles (PHEVs) are generally equipped with larger batteries and may travel longer distances than other HEVs in electric only mode.

SUMMARY

A hybrid vehicle according to the present disclosure includes an electric drive system including a traction battery, an internal combustion engine, and a controller. The controller is configured to, in response to an anticipated vehicle route for a current drive cycle including at least first and second preferred electric drive zones ("green zones" or "EV zones") where the second EV zone is subsequent to the first along the route, control the engine to charge the battery in response to a battery state of charge ("SOC") falling below various thresholds at various portions of the vehicle route. The controller is configured to control the engine to charge the battery in response to the battery SOC falling below a first threshold and the vehicle not having entered the first EV zone. The controller is additionally configured to control the engine to charge the battery in response to the battery SOC falling below a second threshold and the vehicle having entered the first EV zone but not having entered the second EV zone. The controller is further configured to control the engine to charge the battery in response to the battery SOC falling below a third threshold and the vehicle having entered the second EV zone. The first threshold is greater than the second threshold, and the second threshold is greater than the third threshold.

In some embodiments, the vehicle additionally includes a vehicle navigation system. In such embodiments, the anticipated vehicle route for the current drive cycle is a user-selected route input into the vehicle navigation system. In additional embodiments, the first threshold provides an SOC margin sufficient to operate in an electric-only mode on the anticipated vehicle route in the first and second EV zones, and the second threshold provides an SOC margin sufficient to operate in the electric-only mode on the anticipated vehicle route in the second EV zone.

In some embodiments, the controller is additionally configured to, in response to a detected vehicle location within the first EV zone, the battery SOC falling below the second threshold, and a predicted battery usage to exit the first EV zone on the vehicle route in an electric only mode leaving sufficient battery SOC to operate in the electric-only mode on the anticipated vehicle route in the second EV zone; reduce the second threshold by a charge quantity sufficient to operate the vehicle in the electric only mode to exit the first EV zone. The controller additionally reduces the third threshold by a corresponding charge quantity.

A method for controlling a vehicle according to the present disclosure includes, for an anticipated vehicle route for a current drive cycle that includes first and subsequent second EV zones, controlling an engine to charge a traction battery in response to a battery SOC falling below a first threshold prior to entering the second EV zone. The method additionally includes controlling an engine to charge a traction battery in response to the SOC falling below a second threshold subsequent to entering the second EV zone. The second threshold is less than the first threshold.

In some embodiments, the anticipated vehicle route for the current drive cycle includes a third EV zone subsequent to the first and second EV zones. In such embodiments, the method additionally includes controlling the engine to charge the traction battery in response to the battery SOC falling below a third threshold subsequent to entering the third EV zone. In one embodiment, the first threshold is greater than the second threshold by a charge quantity sufficient to support vehicle operation in an electric drive mode on the vehicle route in the second EV zone.

A vehicle according to the present disclosure includes a traction battery, an engine, and a controller. The controller is configured to, for a vehicle route for a current drive cycle that includes multiple EV zones, control the engine to charge the battery in response to an SOC falling below a first threshold prior to entering a second EV zone. The controller is additionally configured to control the engine to charge the battery in response to the SOC falling below a second threshold subsequent to entering the second EV zone. The second threshold is less than the first threshold.

In some embodiments, where the vehicle route for the current drive cycle includes a third EV zone subsequent to the first and second EV zones, the controller is further configured to control the engine to charge the battery in response to the SOC falling below a third threshold subsequent to entering the third EV zone. In additional embodiments, the first threshold is greater than the second threshold by a charge quantity sufficient to support vehicle operation in an electric drive mode on the vehicle route in the second EV zone. Some embodiments include a vehicle navigation system, where the vehicle route for a current drive cycle is a user-selected route input into the vehicle navigation system.

Embodiments according to the present disclosure provide a number of advantages. For example, the present disclosure provides a method for efficiently reserving adequate battery charge for driving across a plurality of preferred electric driving zones. The present disclosure also provides a method for coordinating various hybrid modes of operation.

The above and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
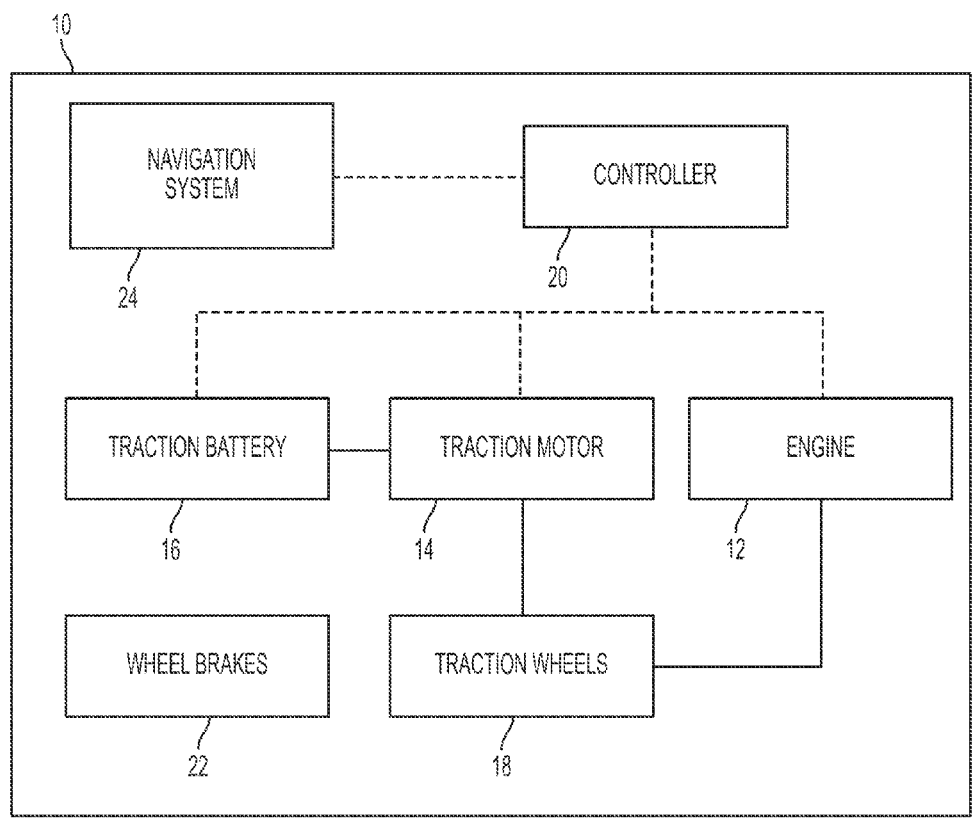
FIG. 1 is a schematic representation of a vehicle according to one embodiment of the present disclosure.

Referring now to FIG. 1, the powertrain of a PHEV 10 includes an engine 12, at least one electric motor/generator 14, and a traction battery 16. The engine 12 and the motor/generator 14 are each provided with torque transmission paths to vehicle traction wheels 18. The engine can also charge the traction battery 16 through the motor/generator 14.

The engine 12, motor/generator 14, and traction battery 16 are all in communication with or under the control of at least one controller 20. The controller 20 may be a vehicle systems controller, a combination of an engine system controller and a battery system controller, or other controllers as appropriate.

Vehicle kinetic energy may also be recovered and regenerated using wheel brakes 22 to drive the motor/generator and recharge the battery. The PHEV 10 further includes an externally-accessible electrical interface (not shown) for plugging into a charging station.

The PHEV 10 additionally includes a navigation system 24, such as a GPS system. The navigation system 24 is in communication with or under the control of controller 20. The navigation system may be an installed in-vehicle navigation system or a standalone navigation system, such as a portable GPS or a navigation-equipped mobile device, that is in communication with the controller 20.

Hybrid vehicles, including PHEVs, may operate in three general categories of operation modes with respect to energy management and battery SOC: charge sustaining, charge depletion, and charge elevation. In a charge sustaining mode, the PHEV is controlled to maintain the battery SOC in the vicinity of an SOC threshold. This threshold may be referred to as a battery charge sustaining level. As a non-limiting example, a default battery charge sustaining level may be set at approximately 30% battery SOC. In a charge depletion control mode, battery electricity is consumed to power the electric drive system, such that the battery SOC decreases over a given driving distance. In a charge elevation control mode, fuel energy is converted into battery electricity by the powertrain, such that the battery SOC increases over a given driving distance.

The PHEV 10 is configured to operate in an "electric only" mode, a type of charge depletion control mode. In this mode, the engine 12 is stopped. The motor/generator 14 provides torque to the traction wheels 18 using stored electric energy from the traction battery 16. In electric only mode, regenerative braking is still available to recover kinetic energy as stored electric energy. To avoid over-depleting the traction battery 16, a battery state of charge threshold is provided. If the battery state of charge falls below the threshold, then the engine 12 will be started in order to charge the traction battery 16. The engine 12 may be started in response to a command from controller 20 or other controllers as appropriate.

In some areas, it is preferable for the vehicle to remain in electric only mode for as long as possible. In some regions, local regulations may make it desirable to operate in electric only mode. As an example, London levies a congestion charge on vehicles operating in the central part of the city during certain peak hours. This congestion charge is fully discounted for electric vehicles. In other regions, the vehicle operator may prefer to operate in electric only mode for other reasons. As an example, the vehicle operator may prefer to operate in electric only mode in his or her neighborhood to reduce local pollution and noise. Collectively, these and other regions in which it is desirable to operate in electric only mode may be referred to as "EV zones" or "green zones."

When multiple green zones are expected, it is desirable to reserve a charge quantity to cover all anticipated green zones. This strategy results in more efficient operation relative to depleting and subsequently elevating the battery SOC between green zones.

Figure 2:
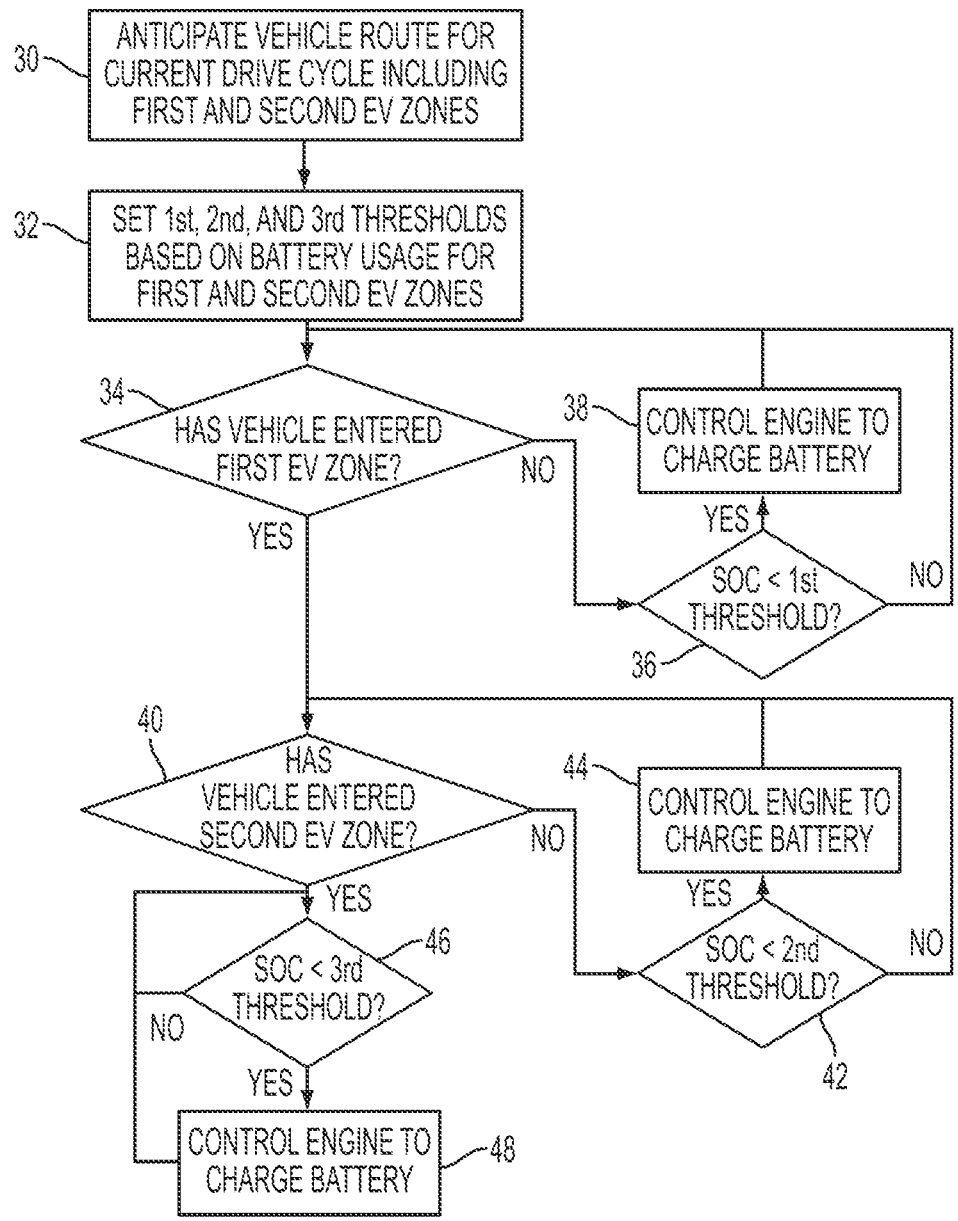
FIG. 2 is a flowchart illustrating a method according to one embodiment of the present disclosure.

Referring to FIG. 2, a control strategy for a hybrid vehicle is illustrated in flowchart form. A vehicle route for a current drive cycle is anticipated, as illustrated at block 30. The vehicle route includes first and second EV zones. Battery usage for electric operation in the first and second EV zones is estimated, and first, second, and third SOC thresholds are set based on the estimated battery usage, as illustrated at block 32. The third SOC threshold may be set at a default sustaining charge level or other level as appropriate. The second SOC threshold is greater than the third SOC threshold by a charge quantity sufficient to support electric-only operation through the second EV zone. The first SOC threshold is greater than the second SOC threshold by a charge quantity sufficient to support electric-only operation through the first EV zone.

A determination is then made of whether the vehicle has entered the first EV zone, as illustrated at operation 34. This determination may be made, for example, based on a vehicle location detected by the navigation system 24. If no, a determination is made of whether a current battery SOC is less than the first threshold, as illustrated at operation 36. If no, then control returns to operation 34. The vehicle may continue to be controlled according to the default hybrid control mode, which may be a charge sustaining, charge elevation, or charge depletion mode. If the SOC is less than the first threshold, then the engine is controlled in a charge elevation mode to charge the battery, as illustrated at block 38. Control then returns to operation 34.

If a determination is made that the vehicle has entered the first EV zone, then a determination is made of whether the vehicle has entered the second EV zone, as illustrated at block 40. If no, a determination is made of whether a current battery SOC is less than the second threshold, as illustrated at operation 42. If no, then control returns to operation 40. If the vehicle is still within the first EV zone, the vehicle may be controlled in electric-only mode. If not, the vehicle may continue to be controlled according to the default hybrid control mode, which may be a charge sustaining, charge elevation, or charge depletion mode. If the SOC is less than the second threshold, then the engine is controlled in a charge elevation mode to charge the battery, as illustrated at block 44. Control then returns to operation 40.

If a determination is made that the vehicle has entered the second EV zone, then a determination is made of whether a current battery SOC is less than the third threshold, as illustrated at operation 46. If yes, then the engine is controlled in a charge elevation mode to charge the battery, as illustrated at block 48. Control then returns to operation 46. If no, then control remains at operation 46 and monitors the current battery SOC relative to the third threshold. If the vehicle is still within the first EV zone, the vehicle may be controlled in electric-only mode. If not, the vehicle may continue to be controlled according to the default hybrid control mode, which may be a charge sustaining, charge elevation, or charge depletion mode.

As can be seen, the above described method incrementally reduces a sustaining charge level as the vehicle approaches and passes through a series of preferred electric zones. Sufficient charge for electric operation in EV zones is reserved at the beginning of the trip and gradually released for use. Such operation may be more efficient than discharging the battery to a default sustaining charge level after exiting an EV zone and subsequently elevating the sustaining charge level again prior to entering a subsequent EV zone.

Figure 3:
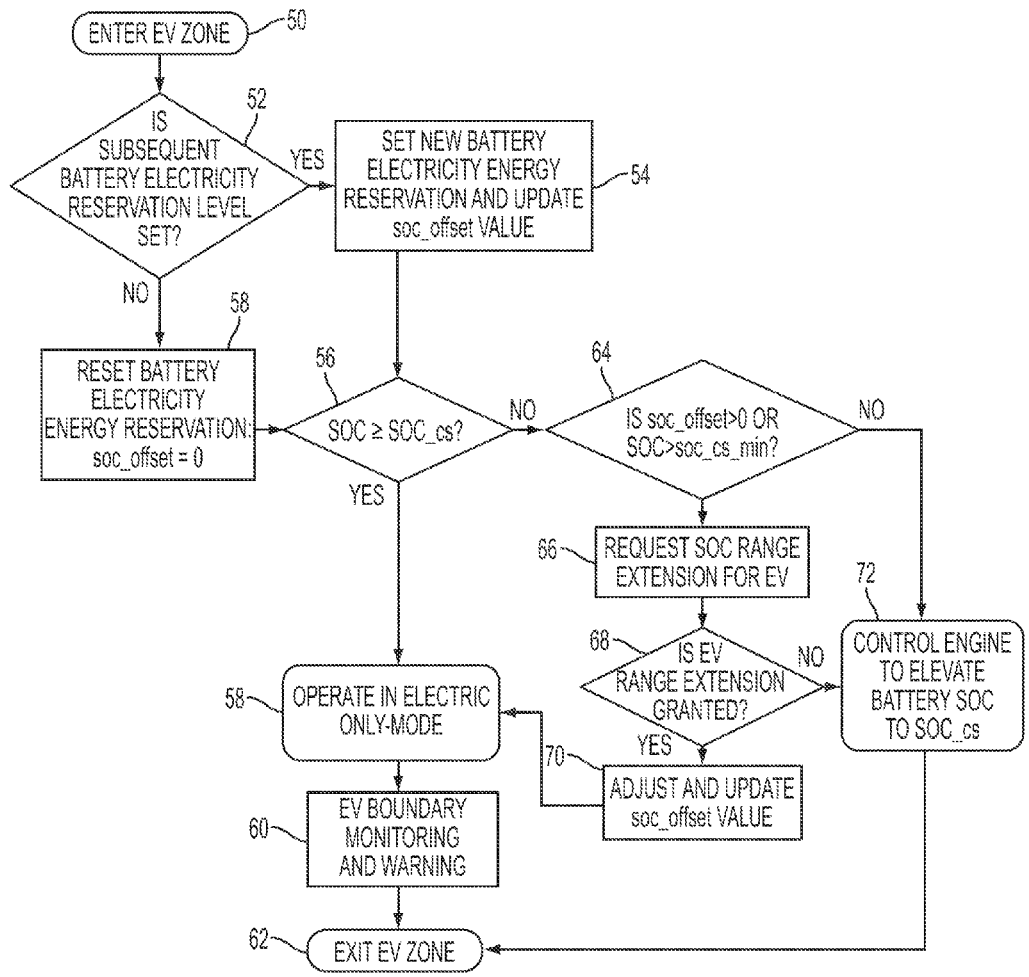
FIG. 3 is a flowchart illustrating a method according to another embodiment of the present disclosure.

Referring to FIG. 3, another embodiment of a method according to the present disclosure is illustrated in flowchart form. The algorithm begins at block 50 when the vehicle enters an EV zone. A default sustaining charge level, SOC_cs_dft is provided. A charge offset, SOC_offset, may also be provided such that a current sustaining charge level, SOC_cs, is defined by:

$$SOC\_cs = SOC\_cs\_dft + SOC\_\text{offset}$$

An energy quantity to be reserved for future use, SOC_offset_2, may also be provided. This charge reservation quantity may be provided in response to an anticipated vehicle route that crosses at least one EV zone, and have a magnitude sufficient to power the vehicle in electric only mode across the at least one EV zone.

A determination is made at operation 52 of whether a battery electricity reservation level for subsequent use, SOC_offset_2, is set. If a value for SOC_offset_2 is set, then control proceeds to block 40. SOC_offset is updated to take the value of SOC_offset_2, and a new energy reservation quantity SOC_offset_2 is set. The value of SOC_offset_2 is reduced by a charge quantity corresponding to an estimated charge usage to cross the EV zone. A portion of the reserved charge may thus be released for use to power the vehicle in electric mode across the EV zone. Control proceeds to operation 56. Returning to operation 52, if no battery reservation level is set, i.e. SOC_offset_2 is equal to 0, then SOC_offset is also set to 0. Control subsequently proceeds to operation 56.

A determination is made at operation 56 of whether a current battery state of charge, SOC, is greater than or equal to the current sustaining threshold, SOC_cs. If yes, then the vehicle operates in an electric only mode, as illustrated at block 58. In this mode, the vehicle monitors the approach to the boundary of the EV zone, as illustrated at block 60. This may be performed by comparing a current detected vehicle location against the geographic boundaries of the EV zone. In this mode, the vehicle will also signal an alert to warn the driver if a vehicle condition may cause the engine to start. Non-limiting examples of such conditions include high electrical current draw for accessories, or high cabin heater requirements. The driver thus may adjust vehicle settings to prevent the engine starting while in the EV zone. The vehicle subsequently exits the EV zone, as illustrated at block 62.

Returning to operation 56, if a determination is made that the current battery state of charge is not greater than or equal to the current sustaining threshold, then a determination is made of whether either of the following two conditions is true: whether SOC_offset is greater than 0, and whether the current SOC is greater than a minimum allowable battery charge SOC_cs_min. The minimum allowable battery charge may be a non-zero SOC level that is less than the default sustaining charge level. This level may be set to avoid repeated over-depletion of the battery.

If either condition is true, then an SOC range extension for operation in electric only mode is requested, as illustrated in block 66. A determination is then made of whether to grant the EV range extension, as illustrated at operation 68. This determination comprises estimating a quantity of electric energy demand to exit the EV zone in electric only mode, SOC_ev_req. If SOC_offset>SOC_ev_req>0, i.e. the current charge offset above the default sustaining charge level exceeds the quantity of electric energy demand to exit the EV zone in electric only mode, then a determination is made of whether SOC_offset may be reduced by a charge quantity equal to SOC_ev_req. This determination may be based on variables including the presence of subsequent EV driving zones, whether the remaining reserved charge is sufficient to cover electric driving in those subsequent EV zones, and the presence of opportunities to elevate the battery state of charge prior to entering subsequent EV zones. It may also, of course, be based on various other variables or inputs as appropriate.

If a determination is made to grant the EV range extension, then SOC_offset is adjusted, as illustrated at block 70. Preferably, this adjustement includes reducing SOC_offset by a quantity at least equal to SOC_ev_req. Control then proceeds to block 58 and the vehicle operates in electric-only mode.

If a determination is made to not grant the EV range extension, then the engine is controlled to elevate the current battery SOC to SOC_cs, as illustrated at block 72. This control is regardless of the presence of the vehicle in a green zone, to ensure continued operation of the vehicle.

Returning to operation 64, if SOC_offset is not greater than zero and the current SOC is not greater than SOC_cs_min, then the engine is controlled to elevate the current battery SOC to SOC_cs, as illustrated at block 72.

Variations of the above algorithm are, of course, possible. For example, the operation of step 56 may compare the current SOC not directly against the current sustaining charge threshold SOC_cs, but rather against a buffer region above and below SOC_cs. A small buffer value may prevent unnecessarily brief engine on/off cycles.

As can be seen from the various embodiments, the present invention provides a method for efficiently reserving adequate battery charge for driving across a plurality of preferred electric driving zones. The present disclosure also provides a method for coordinating various hybrid modes of operation.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A vehicle comprising:
an electric drive system including a traction battery;
an internal combustion engine; and
a controller programmed to, in response to a user-selected predetermined vehicle route input into a vehicle navigation system for a current drive cycle including a first electric drive zone ("EV zone") and a subsequent second EV zone,
  control the engine to charge the battery in response to a battery state of charge ("SOC") falling below a first threshold prior to the vehicle entering the first EV zone,
  control the engine to charge the battery in response to the battery SOC falling below a second threshold less than the first threshold and the vehicle having entered the first EV zone but not the second EV zone, and
  control the engine to charge the battery in response to the battery SOC falling below a third threshold less than the second threshold and the vehicle having entered the second EV zone,
wherein the thresholds are based on a battery SOC sufficient to operate the vehicle in an electric-only mode within the first and second EV zones of the predetermined vehicle route.

2. The vehicle of claim 1, wherein the first threshold provides an SOC margin sufficient to operate in an electric-only mode on the vehicle route in the first and second EV zones and the second threshold provides an SOC margin sufficient to operate in the electric-only mode on the vehicle route in the second EV zone.

3. The vehicle of claim 2, wherein the controller is further programmed to, in response to a detected vehicle location within the first EV zone, the battery SOC falling below the second threshold, and a predicted battery usage to exit the first EV zone on the vehicle route in an electric only mode leaving sufficient battery SOC to operate in the electric-only mode on the vehicle route in the second EV zone, reduce the second threshold by a charge quantity sufficient to operate the vehicle in the electric only mode to exit the first EV zone and reduce the third threshold by a corresponding charge quantity.

4. A method for controlling a vehicle comprising:
for a user-selected predetermined vehicle route of a current drive cycle that includes first and subsequent second EV zones, generating a first SOC threshold and a second SOC threshold based on a battery SOC sufficient to operate the vehicle in an electric-only mode within the first and second EV zones, and controlling an engine to charge a traction battery in response to a battery SOC falling below the first SOC threshold prior to entering the second EV zone and in response to the SOC falling below the second SOC threshold subsequent to entering the second EV zone.

5. The method of claim 4, further comprising controlling the engine to charge the traction battery in response to the battery SOC falling below a third SOC threshold subsequent to entering a third EV zone, where the vehicle route of the current drive cycle includes the third EV zone subsequent to the first and second EV zones.

6. The method of claim 4, wherein the first SOC threshold is greater than the second SOC threshold by a charge quantity sufficient to support vehicle operation in an electric drive mode on the vehicle route in the second EV zone.

7. A vehicle comprising:
a traction battery;
an engine; and
a controller programmed to control the engine to charge the battery in response to detection of a traction battery SOC below a first SOC threshold prior to entering a first EV zone of a user-selected predetermined route, and to charge the battery in response to detection of the traction battery SOC below a second SOC threshold prior to entering a second EV zone of the route.

8. The vehicle of claim 7, wherein the controller is further programmed to control the engine to charge the battery in response to the SOC falling below a third threshold subsequent to entering a third EV zone, wherein the route includes the third EV zone subsequent to the first and second EV zones.

9. The vehicle of claim 7, wherein the first threshold is greater than the second threshold by a charge quantity sufficient to support vehicle operation in an electric drive mode on the route in the second EV zone.

10. The vehicle of claim 7, further comprising a vehicle navigation system, wherein the route for a current drive cycle is a user-selected route input into the vehicle navigation system.

* * * * *